(12) United States Patent
Groeneveld

(10) Patent No.: US 6,925,958 B2
(45) Date of Patent: Aug. 9, 2005

(54) DRIVING DEVICE INCLUDING A POSITION INDICATOR

(75) Inventor: Floris J. Groeneveld, Hengelo (NL)

(73) Assignee: EL-O-Matic B.V., Hengelo (NL)

(*) Notice: Subject to any disclaimer, the term of this patent is extended or adjusted under 35 U.S.C. 154(b) by 0 days.

(21) Appl. No.: 10/312,306
(22) PCT Filed: Jun. 11, 2001
(86) PCT No.: PCT/NL01/00439
§ 371 (c)(1), (2), (4) Date: May 5, 2003
(87) PCT Pub. No.: WO01/98699
PCT Pub. Date: Dec. 27, 2001

(65) Prior Publication Data
US 2003/0172754 A1 Sep. 18, 2003

(30) Foreign Application Priority Data
Jun. 18, 2000 (NL) .............................................. 1015551

(51) Int. Cl.⁷ ................................................. G01D 5/00
(52) U.S. Cl. ...................... 116/282; 116/284; 340/686.1
(58) Field of Search ................................. 116/281, 282, 116/284, 285; 340/686.1, 686.2, 686.3, 686.4, 686.5, 679

(56) References Cited

U.S. PATENT DOCUMENTS 2,099,100 A * 11/1937 Bond ........................... 116/285
3,666,067 A * 5/1972 Kaiser ......................... 194/225
3,690,287 A * 9/1972 Jedynak et al. ............. 116/281
4,114,474 A * 9/1978 Stratienko .................... 74/625
4,353,390 A   10/1982 Karpenko
4,505,151 A * 3/1985 Sauerschell et al. .......... 73/116
4,679,764 A * 7/1987 Smith et al. .................. 74/625
4,709,654 A * 12/1987 Smith .......................... 116/283
6,572,523 B2 * 6/2003 Herman et al. ............. 116/281

FOREIGN PATENT DOCUMENTS

| CH | 371830 | 10/1963 |
| FR | 2271471 | 1/1976 |
| JP | 11082085 | 3/1999 |
| JP | 2000170953 | 6/2000 |

* cited by examiner

Primary Examiner—Christopher W. Fulton
Assistant Examiner—Travis Reis
(74) Attorney, Agent, or Firm—Marshall, Gerstein Borun LLP

(57) ABSTRACT

This invention relates to a driving device (1) comprising a drive shaft (3) that is rotatably supported in a housing, which driving device includes a position indicator for said drive shaft, wherein a cam (27) is present on the drive shaft, whose cam surface mates with one end of a feeler pin (29) which extends perpendicularly to the drive shaft, and which end is pressed against said cam surface under spring pressure (37), all this in such manner that movement of the feeler pin in its longitudinal direction, which is effected by the cam surface upon rotation of the drive shaft, provides an indication as regards the angular displacement of the drive shaft.

Figure 1:
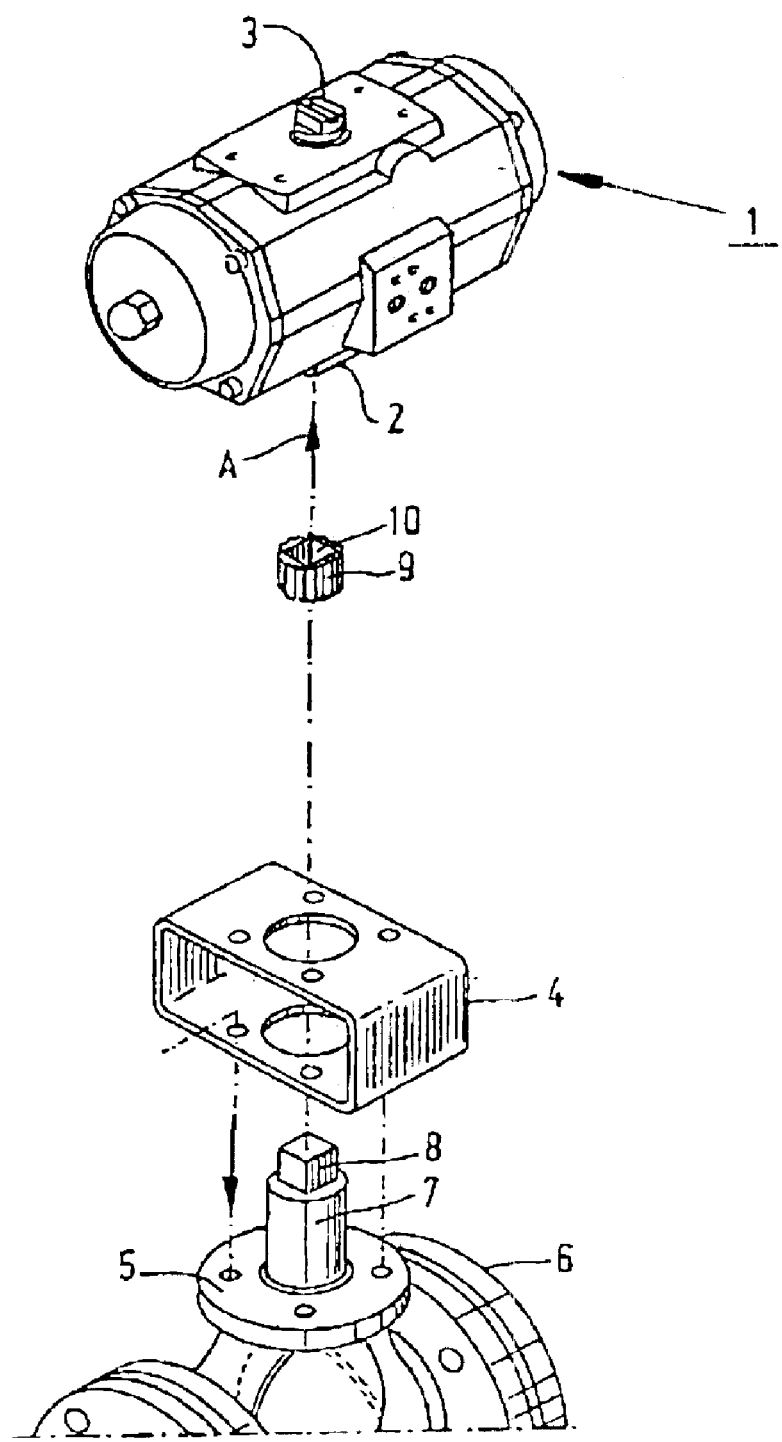

7 Claims, 2 Drawing Sheets though here reference is made by way of example to a driving device for a valve. It will be understood that the described device may also be used in other situations in which it is desirable to detect the angular position of a drive shaft of a driving device, whilst furthermore all kinds of modifications of the above described embodiment are possible within the scope of the invention as defined in the following claims.

DRIVING DEVICE INCLUDING A POSITION INDICATOR

DESCRIPTION

The invention relates to a driving device comprising a drive shaft that is rotatably supported in a housing, which driving device includes a position indicator for said drive shaft, a cam being present on the drive shaft, whose cam surface mates with one end of a feeler pin which extends perpendicularly to the drive shaft, and which end is pressed against said cam surface under spring pressure, all this in such a manner that movement of the feeler pin in its longitudinal direction, which is effected by the cam surface upon rotation of the drive shaft, provides an indication as regards the angular displacement of the drive shaft.

Driving devices are generally known. In various uses of such driving devices it is important to the user to be able to inform himself of the rotational position of the drive shaft, since this position provides information about the status of the device that is being driven. An example of such a device is a driving device which is used for actuating a closing element of a valve.

It is known to mount a position indicator on a free end of the drive shaft, from which position indicator the angular position of the drive shaft can be directly read. Information about the angular position may also form an important parameter within a control system. A free drive shaft end is not always available, however. This is for example the case when both ends of the drive shaft are, or can be, connected to the device that is to be driven.

A driving device according to, the preamble is known from Japanese patent application JP 11 082805 A. In this document a valve manually operating machine is disclosed comprising a drive shaft with a cam surface around part of its circumference. This cam surface cooperates with a feeler pin being pressed under spring pressure against the cam surface. The longitudinal position of the feeler pin is an indication about the angular displacement of the drive shaft. The disadvantage of the above described configuration is that any play in the support of the drive shaft will affect the position of the feeler pin making its indication less reliable.

The object of the invention is to provide a driving device according to the preamble, the indication of the feeler pin of which cannot be influenced by a possible play in the support of the drive shaft.

In order to accomplish that objective, the driving device according to the invention is characterized in that said feeler pin is movably supported in a support member which is movable in a direction perpendicularly to the central axis of the drive shaft, and which is pressed against a surface which extends concentrically about the central axis of the drive shaft under spring pressure. With such an embodiment, any play in the support of the drive shaft will not affect the relation between the angular position of the drive shaft and the position of the feeler pin with respect to the supporting member. For that reason, a sensor may advantageously be mounted on the supporting member.

The invention will now be explained in more detail with reference to the accompanying figures.

FIG. 1 is a schematic view of spaced-apart parts of a known driving device and part of a valve by means of which said driving device can be opened and closed.

Figure 2:
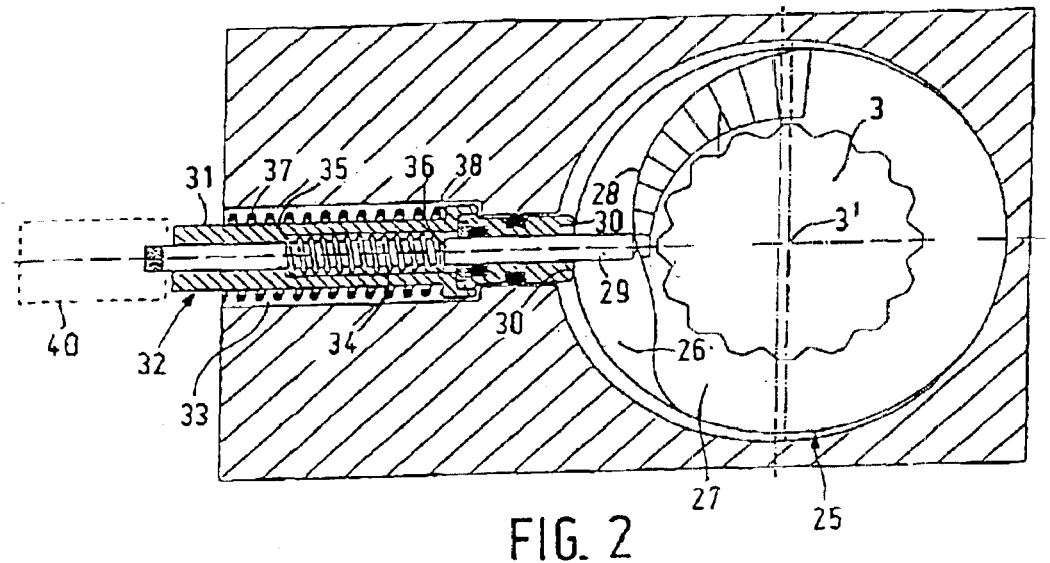

FIG. 2 schematically shows the drive shaft fitted with a detection system for the angular displacement of the drive shaft.

Figure 3:
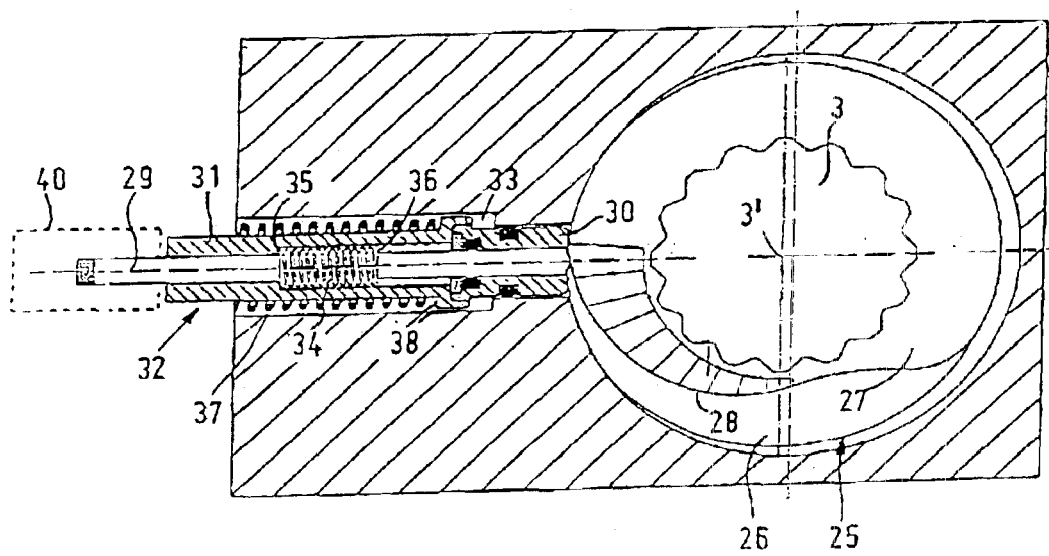

FIG. 3 is a view corresponding to FIG. 2, wherein the drive shaft has been turned through 90°.

By way of a non-limitative example, a description of a driving device suitable for implementation of the invention will now be given with reference to FIG. 1.

FIG. 1 schematically shows a driving device 1 which is known per se, which driving device includes a connecting surface 2 on its bottom side, which defines an opening through which the lower end of a drive shaft 3 is accessible, as is indicated by means of an arrow A.

Using a connecting piece 4, said driving element can be mounted on a flange 5 of a valve 6. A closure element supported in said valve, which can conventionally be made up of a disc, a ball or a plug, is attached to a shaft 7 which projects above said flange, which shaft includes an end part 8 of square section. Said square end part 8 can be received in a square hole 10 formed in connecting piece 9. Said connecting piece 9 forms part of the drive shaft 3 for connection to said end part 8. As is shown in the FIGURE, one end of the drive shaft 3 generally projects above the housing in the known embodiment, on the side of the housing remote from the connecting surface, for the purpose of connecting position indicators or the like thereto.

Determination of the position of the drive shaft takes place by means of the mechanism that is shown in FIGS. 2 and 3.

As is shown in said figures, a disc-shaped member 25 is mounted on drive shaft 3, which disc-shaped member comprises a cylindrical part 26, whose outer circumference extends concentrically about the central axis 3' of shaft 3, as well as a cam part 27 formed integrally therewith, which includes a curved cam surface 28 extending over part of the circumference thereof. Said cam surface 28 mates with the end of a feeler pin 29 which extends perpendicularly to the central axis of drive shaft. Said feeler pin 29 is movably accommodated in its longitudinal direction in a guide bush 32 consisting of two parts 30 and 31, which guide bush is accommodated in a stepped bore 33 formed in the housing of the driving device.

Disposed in the interior of said guide pin is a compression spring 34 surrounding feeler pin 29, which spring is confined between a shoulder 35 formed in the interior of said guide bush and a ring 36 attached to said feeler pin, all this in such a manner that spring 34 tends to keep the end of feeler pin 29 in abutment with cam surface 28.

Guide bush 32 is movably accommodated, in a direction parallel to the longitudinal direction of pin 29, in the bore 33 formed in housing 1. Said guide bush is thereby surrounded by a compression spring 37, which is confined between a shoulder 38 formed on said guide bush and a cover (not shown) which closes said bore 33 in the housing, all this in such a manner that said spring attempts to keep the end of guide bush 32 in abutment with the outer circumference of the circular part 26 of disc-shaped member 25 in the manner that is shown in FIGS. 2 and 3.

It will be understood that feeler pin 29 will be pushed outwards upon rotation of drive shaft 3 through an angle of 90° from the position that is shown in FIG. 2 to the position that is shown in FIG. 3, which rotation will generally correspond to the rotation of the closure element of a valve, which is connected to said drive shaft, between an open position and a closed position, or vice versa, wherein the distance over which pin 29 is pushed outwards is related to the angle through which the drive shaft has rotated. Said movement of the feeler pin 29 can be detected, for example, by means of a sensor 40 mounted on one end of guide bush 32, and be suitably displayed by means of said sensor.

As is indicated in FIGS. 2 and 3, any play in the support for drive shaft 3 may lead to a shift in the position of the central axis 3' of the drive shaft 3 upon rotation of the drive shaft. As a consequence, also the outer circumference of the disc-shaped member 26, and thus the guide bush 32, will shift in a direction parallel to the direction of movement of feeler pin 29. Thus, a possible shift of the central axis 3' of the drive shaft 3 will not affect the relative movement between the feeler pin 29 and the guide bush 32 supporting said feeler pin, on which sensor 40 is mounted, so that such movement of shaft 3 will not influence the result of the measurement of the angular displacement.

What is claimed is:

1. A driving device comprising a drive shaft that is rotatably supported in a housing, a position indicator for said drive shaft, and a cam on the drive shaft, the cam having a cam surface that mates with one end of a feeler pin that extends perpendicularly to the drive shaft, the one end of the feeler pin being pressed against the cam surface under spring pressure such that movement of the feeler pin in its longitudinal direction, which is effected by the cam surface upon rotation of the drive shaft, provides an indication of the angular displacement of the drive shaft, the feeler pin being movably supported in a support member that is movable in a direction perpendicular to the central axis of the drive shaft, and the support member being pressed against a surface that extends concentrically about the central axis of the drive shaft under spring pressure.

2. A driving device according to claim 1, wherein the support member is made up of a guide bush in which the feeler pin is movably accommodated.

3. A driving device according to claim 1, wherein movement of the feeler pin is detected by a sensor.

4. A driving device according to claim 1, wherein the sensor is mounted on the support member.

5. A driving device according to claim 1, wherein the surface that the support member presses against is a surface on the drive shaft.

6. A driving device according to claim 1, wherein the support member is mounted for lateral movement with respect to the housing.

7. A driving device according to claim 1, wherein the support member is mounted for lateral movement with respect to the housing, and the indication of the angular displacement of the drive shaft is provided by the position of the feeler pin with respect to the movable support member.

* * * * *

UNITED STATES PATENT AND TRADEMARK OFFICE
CERTIFICATE OF CORRECTION

PATENT NO. : 6,925,958 B2
DATED : August 9, 2005
INVENTOR(S) : Floris J. Groeneveld It is certified that error appears in the above-identified patent and that said Letters Patent is hereby corrected as shown below:

Column 1,
Line 32, delete "to," and insert -- to --.

Column 2,
Line 19, delete "FIGURE" and insert -- figure --.
Line 55, delete "FIGS." and insert -- Figures --.
Lines 58 and 59, delete "FIG." and insert -- Figure --.

Signed and Sealed this

Twenty-first Day of February, 2006

JON W. DUDAS
*Director of the United States Patent and Trademark Office*